(12) United States Patent
Ginetti et al.

(10) Patent No.: US 10,783,312 B1
(45) Date of Patent: Sep. 22, 2020

(54) METHODS, SYSTEMS, AND COMPUTER PROGRAM PRODUCT FOR DETERMINING LAYOUT EQUIVALENCE FOR A MULTI-FABRIC ELECTRONIC DESIGN

(71) Applicant: Cadence Design Systems, Inc., San Jose, CA (US)

(72) Inventors: Arnold Jean Marie Gustave Ginetti, Antibes (FR); Gerard Tarroux, Saint Paul (FR); Jean-Noel Pic, Valbonne (FR); Xavier Alasseur, Ajaccio (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/157,011

(22) Filed: Oct. 10, 2018

(51) Int. Cl.
| | |
|---|---|
| *G06F 17/50* | (2006.01) |
| *G06F 30/398* | (2020.01) |
| *G06F 30/367* | (2020.01) |
| *G06F 30/392* | (2020.01) |
| *G06F 111/20* | (2020.01) |

(52) U.S. Cl.
CPC .......... *G06F 30/398* (2020.01); *G06F 30/367* (2020.01); *G06F 30/392* (2020.01); *G06F 2111/20* (2020.01)

(58) Field of Classification Search
CPC ............. G06F 17/5081; G06F 2217/04; G06F 2217/02; G06F 2217/40; G06F 30/398; G06F 30/392; G06F 30/367; G06F 2111/20
USPC ......... 716/103–107, 110–112, 118–119, 132, 716/139
See application file for complete search history.

(56) References Cited

U.S. PATENT DOCUMENTS

| | | |
|---|---|---|
| 4,457,027 A | 7/1984 | Gladstone |
| 6,397,370 B1 | 5/2002 | Fernandez |
| 6,748,572 B2 | 6/2004 | Fujine |
| 7,257,799 B2 | 8/2007 | McKenney |
| 7,318,207 B2 | 1/2008 | Takabe |
| 7,468,982 B2 | 12/2008 | Mehra |
| 7,555,739 B1 | 6/2009 | Ginetti |
| 7,779,286 B1 | 8/2010 | Pritchard |
| 7,802,221 B1 | 9/2010 | Brink |
| 8,136,071 B2 | 3/2012 | Solomon |
| 8,191,035 B1 | 5/2012 | Van Brink |
| 8,286,025 B1 | 10/2012 | Pritchard |
| 8,930,878 B1 | 1/2015 | Leef |

(Continued)

OTHER PUBLICATIONS

Non-Final Office Action dated Nov. 6, 2019 for U.S. Appl. No. 16/157,005.

(Continued)

*Primary Examiner* — Nghia M Doan
(74) *Attorney, Agent, or Firm* — Vista IP Law Group, LLP

(57) ABSTRACT

Disclosed are methods, systems, and articles of manufacture for determining layout equivalence between a plurality of versions of a single layout of a multi-fabric electronic design. These techniques identify a first version and a second version of a layout of an electronic design that spans across multiple design fabrics. One or more collaborative comparator modules are executed to determine whether the first version is identical to or different from the second version of the layout. These techniques further modify the first version or the second version of the layout with discrepancy annotation.

20 Claims, 11 Drawing Sheets

(56) References Cited

U.S. PATENT DOCUMENTS

| | | | |
|---|---|---|---|
| 9,092,586 B1 | 7/2015 | Ginetti | |
| 9,129,081 B2 | 9/2015 | Ginetti | |
| 9,141,746 B1 | 9/2015 | Ginetti | |
| 9,208,273 B1 | 12/2015 | Morlat | |
| 9,223,915 B1 | 12/2015 | Ginetti | |
| 9,286,421 B1* | 3/2016 | Kukal | G06F 17/5022 |
| 9,542,084 B1 | 1/2017 | Colancon | |
| 9,684,748 B1 | 6/2017 | Badel | |
| 9,761,204 B1 | 9/2017 | Ginetti | |
| 9,773,082 B1 | 9/2017 | Morlat | |
| 9,830,417 B1 | 11/2017 | Ginetti | |
| 9,842,183 B1 | 12/2017 | Ginetti | |
| 10,331,841 B1 | 6/2019 | Ginetti | |
| 10,496,772 B1 | 12/2019 | Ginetti | |
| 2004/0156322 A1 | 8/2004 | Mehra | |
| 2008/0313581 A1* | 12/2008 | Gernhoefer | G06F 17/5045 716/103 |
| 2010/0205575 A1 | 8/2010 | Arora | |
| 2011/0049722 A1 | 3/2011 | Sun et al. | |
| 2013/0097572 A1 | 4/2013 | Ginetti | |
| 2015/0089458 A1* | 3/2015 | Chang | G06F 30/398 716/52 |
| 2016/0070841 A1 | 3/2016 | Salowe | |
| 2016/0147908 A1* | 5/2016 | Ni | G06F 17/50 703/1 |

OTHER PUBLICATIONS

Non-Final Office Action dated Nov. 14, 2019 for U.S. Appl. No. 16/157,001.
Notice of Allowance dated Feb. 9, 2016 for U.S. Appl. No. 14/503,403.
Ex Parte Quayle dated Nov. 27, 2015 for U.S. Appl. No. 14/503,403.
Final Office Action dated Apr. 9, 2020 for U.S. Appl. No. 16/157,005.
Final Office Action dated Apr. 14, 2020 for U.S. Appl. No. 16/157,001.
Notice of Allowance dated Aug. 5, 2020 for U.S. Appl. No. 16/157,005.
Notice of Allowance dated Aug. 4, 2020 for U.S. Appl. No. 16/157,001.

* cited by examiner

METHODS, SYSTEMS, AND COMPUTER PROGRAM PRODUCT FOR DETERMINING LAYOUT EQUIVALENCE FOR A MULTI-FABRIC ELECTRONIC DESIGN

CROSS REFERENCE TO RELATED APPLICATIONS

This application is also related to U.S. patent application Ser. No. 16/157,001 filed on concurrently and entitled "METHODS, SYSTEMS, AND COMPUTER PROGRAM PRODUCT FOR REDUCING INTERFERENCES AND DISTURBANCES IN A MULTI-FABRIC ELECTRONIC DESIGN", and U.S. patent application Ser. No. 16/157,005 filed on concurrently and entitled "METHODS, SYSTEMS, AND COMPUTER PROGRAM PRODUCT FOR INTERACTIVELY PROBING A MULTI-FABRIC ELECTRONIC DESIGN". This application is also related to U.S. patent application Ser. No. 14/503,404 filed on Oct. 1, 2014 and entitled "METHOD, SYSTEM, AND COMPUTER PROGRAM PRODUCT FOR IMPLEMENTING A MULTI-FABRIC ELECTRONIC DESIGN SPANNING ACROSS MULTIPLE DESIGN FABRICS". The contents of the aforementioned U.S. patent applications are hereby incorporated by reference in their respective entireties for all purposes.

BACKGROUND

In conventional electronic designs, the integrated circuits, the IC (integrated circuit) packaging, and the printed circuit boards are often developed and designed independently. Modern electronic designs often require or desire developing the integrated circuit, their respective packaging, and the printed circuit board incorporating multiple packaged integrated circuits in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may need or desire to implement or tune the printed circuit design in the context of the packaging design fabric and/or the integrated circuit design fabric. As a practical example where an advanced package is to be incorporated onto a PCB for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

An electronic device (e.g., a computing system, a mobile communication device, etc.) is an integrated system that includes, for example, one or more PCBs each having one or more IC packages and a plurality of discrete components, cells, etc. An electronic design for such a device thus includes multiple fabrics such as the PCB design fabric, the IC package design fabric, the IC design fabric, etc. Each design fabric corresponds to its own techfile and databases that are not natively editable by the design tools for other design fabrics. In fact, some of these databases are even incompatible with each other. Conventional approaches thus isolate these design fabrics by using dedicated electronic design automation tools for different design fabrics. When a project starts, conventional approaches distribute the design tasks for each design fabric among team members who then use the dedicated tools to initiate and complete the design.

Often, an IC designer completes an IC layout. A package designer completes the IC package layout with the IC layout. Similarly, a PCB designer may complete the PCB layout with the IC layout(s) and the corresponding IC package layout(s). Regardless of which design fabric in which a layout is created, a layout often, if not always, goes through multiple rounds of revisions and thus often have several different versions.

In a collaborative design environment, multiple designers may simultaneously and/or sequentially work on the same layout. For example, a first designer may modify the IC layout and save the modified IC layout as the first version. At the same time or subsequently, a second designer (or even the same designer who later returns to the layout) may modify the corresponding IC package layout and save the modified layout as a second version. Oftentimes, it may be desired or required that the second designer is aware of, for example, the most recent changes in the layout. In order to know the most recent changes, the second designer may need to compare the two latest versions of the layout to identify the most recent changes.

There are many mechanisms that can be used to determine whether two layouts or the portions thereof are identical. The most frequently used approach is to first flatten each layout by bringing all the shapes to the same level. The two flattened layouts are then compared by performing logical XOR operations on these two flattened layouts to determine whether the two flattened layouts are identical. Another frequently used approach similarly perform logical XOR operations on corresponding pairs of hierarchical levels in these two hierarchical layouts. Regardless of flattened or hierarchical layouts, these conventional approaches perform the logical XOR operations to determine two versions of layout.

Once any discrepancies are identified, such discrepancies are reported to the designer in various forms. The XOR operations adopted by these conventional approaches have several drawbacks. For example, the logical Boolean XOR operations do not and cannot detect the difference in the location of an instance location in two different versions of the layout. Also, the logical Boolean XOR operations do not and cannot detect two shapes that are merged into one shape (e.g., bridging two interconnect segments into a single interconnect segment). Moreover, the logical Boolean XOR operations only show the differences between two versions of the layout but do not provide any other information for the differences. For example, the logical Boolean XOR operations do not and cannot detect whether an object is added, deleted, or modified.

Thus, there is a need for methods, systems, and computer program products for determining layout equivalence between a plurality of versions of a single layout for a multi-fabric electronic design to address at least the aforementioned issues and shortcomings. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for determining layout equivalence between a plurality of versions of a single layout of a multi-fabric electronic design in one or more embodiments. Some embodiments are directed at a method for determining layout equivalence between a plurality of versions of a single layout of a multi-fabric electronic design.

In some embodiments, the present invention identifies a first version and a second version of a layout of an electronic design that spans across multiple design fabrics. One or more collaborative comparator modules are executed to determine whether the first version is identical to or different from the second version of the layout. These techniques further modify the first version or the second version of the layout by discrepancy annotation.

Some of these embodiments identify a first circuit component from a plurality of first circuit components in the first version of the layout; and a second circuit component may further be identified from a plurality of second circuit components in the second version of the layout, wherein the second circuit component in the second version corresponds to the first circuit component in the first version. In addition or in the alternative, some embodiments determine whether one or more discrepancies exist between the first circuit component and the second circuit component at least by examining one or more first characteristics of the first circuit component and one or more second characteristics of the second circuit component.

upon a determination of the one or more discrepancies, some embodiments store information pertaining to the first circuit component, the second circuit component, and the one or more discrepancies in one or more data structures. In addition or in the alternative, a first set of characteristics may be identified for the first circuit component in the first version; and a first representation of the first circuit component may be rendered in a display of the second version of the layout based at least in part upon the first set of characteristics.

In some embodiments, a first marker may be associated with the first representation of the first circuit component in the display of the second version of the layout; and a link may be rendered between the first representation of the first circuit component and the second circuit component in the display of the second version of the layout. In some of these embodiments, a design browser in a user interface may be updated with at least information of the first circuit component and the first marker, the user interface comprising the display of the second version of the layout.

In addition or in the alternative, a second set of characteristics may be identified for the second circuit component in the second version; and a second representation of the second circuit component may be rendered in the display of the first version of the layout based at least in part upon the second set of characteristics. Furthermore, a second marker may be associated with the second representation of the second circuit component in the display of the first version of the layout; a second link may be rendered between the second representation of the second circuit component and the first circuit component in the display of the first version of the layout; and the design browser in the user interface may be updated with at least second information of the second circuit component and the second marker. In some of these embodiments, one or more discrepancies between the first version and the second version may be custom displayed based at least in part upon an input received via an input device at the user interface.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
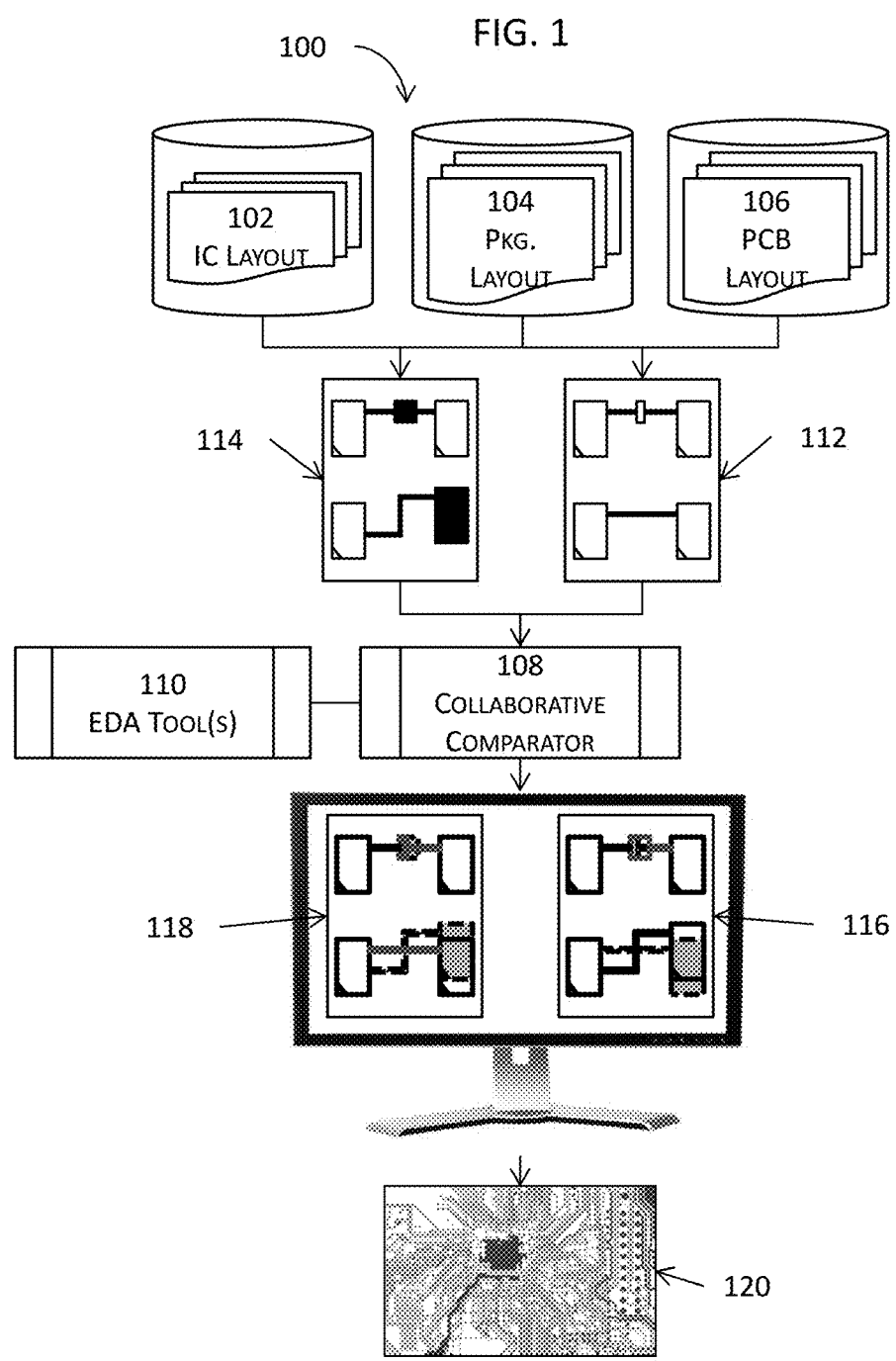
FIG. 1 illustrates a high level block diagram of a simplified system for determining layout equivalence between a plurality of versions of a single layout of a multi-fabric electronic design in one or more embodiments.

Various techniques are directed to determining layout equivalence between a plurality of versions of a single layout of a multi-fabric electronic design in various embodiments. In these embodiments, the present invention completely avoids the logical XOR operations adopted conventional approaches. More specifically, when comparing the first version and the second version of a layout, the present invention identifies a component in the first version and finds the corresponding component in the second version by using, for example, the component identifier.

The present invention then examines the component and the corresponding component in respective versions and determines whether the location and orientation of the component in the first version are identical to the location and orientation of the corresponding component in the second version. For some component such as an interconnect that may change its shape despite carrying the same name, the present invention may identify the component, construct a boundary area that represents the actual area occupied by the component in the first version, and determine whether the corresponding component in the second version coincides with the boundary area.

When a discrepancy is identified between a component in the first version and the corresponding component in the second version, the present invention creates and associates a marker with the component in both versions. The marker, its pertinent information, the associated component, or any other pertinent information may also be added to an annotation browser in the user interface. The information in the annotation browser and the layout window may correspond to or may be linked with each other such that when one is selected, the other is also emphasized (e.g., highlighted).

In some of these embodiments, the design browser may further include a marker that includes or is associated with pertinent information and/or even one or more commands (e.g., context commands that may be invoked by right clicking on the marker) for a user to fix a design problem. For example, a first version of a layout includes an instance, but the second version erroneously does not include this instance. In this example, the design browser of either or both of the first version and the second version may include a marker in both the layout canvas and the design browser. The marker in the second version may be displayed at or around the area where the instance is supposed to be located. Moreover, a user may invoke a command to fix the error giving rise to the marker. For example, a user may right click on the marker in the design browser or the second version of the layout to bring up a contextual command to fix the error. In response to the execution of the contextual command, various modules may be invoked to automatically insert the instance into the second version. Because the second version of the layout does not include the instance to begin with, this automatic insertion of the instance into the second version may place the instance in the second version of the layout according to the location and orientation of the instance in the first version. These automatically invoked modules may further obtain connectivity pertaining to the instance in the first version and complete the connections for the instance in the second version and use the built-in intelligence to avoid any possible routing issues in the second version of the layout. Once the instance is inserted into the second version, the marker in both the first version and the second version may be removed automatically by the computing system or manually by a user.

As another example, both the first version and the second version of the layout include the instance, but the routing for the instance is different between these two versions. For example, the instance in the first version is routed with the first set of interconnects, and the instance in the second version is routed with the second set of interconnects. In this example, the present invention may also display one or more markers indicative of the differences between the first set and second set of interconnects in either or both the respective layout canvases and the respective design browser. In addition, a marker thus displayed may also be associated with one or more commands (e.g., contextual commands) that may be invoked by a user to fix the differences. For example, a user may right click on one of these markers to bring up a fix command on the first version. In response to the execution of this command, the present invention automatically fixes the pertinent interconnects in the first set that correspond to the marker. The marker may then be automatically or manually removed from both the layout canvas and the design browser of the first version of the layout.

A marker may be a visible graphical symbol or some form of graphical emphasis (e.g., different color, highlight, etc.) A marker may also be invisible or suppressed in the display window until an instruction to display discrepancies is executed. Markers may be displayed in a variety of different forms. For example, the present invention may display markers that are associated with a specific type of circuit components (e.g., interconnects, cells, etc.), that are located on a specific layer or in a specific cell or block, connected to a particular component (e.g., a specific input, power rail, net, etc.), that are located on a specific layer (e.g., metal 5 layer), etc., or in any other customizable manner that is configurable by the user.

In some embodiments, the discrepancies may be overlaid in the first version, the second version, or both the first and second versions. For example, if a component in the first version is determined to be different from the corresponding component in the second version of a layout, the corresponding component may be overlaid in the first version together with the component although the corresponding component may be displayed in a de-emphasized manner. Similarly, the component may be overlaid in the second version together with the corresponding component although the component may also be displayed in a de-emphasized manner. In this manner, any discrepancies between two versions of the same layout are displayed and presented in an interactive, customizable, and clear manner for the user to easily spot and manipulate (e.g., perform further modifications) and compare two different versions of the same layout.

It shall be noted that the same techniques can also be applied to more than two versions of the same layout in some embodiments. In these embodiments, a user may suppress the rendering and displaying of one or more versions in a layout window. For example, a layout window for the first version of the layout may be overlaid with the discrepancies in the second version and the third version. The user may choose to not to display the overlaid discrepancies in the second version by clicking a menu icon or menu command and further by selecting the second version or by clicking on any discrepancies corresponding to the second version in the display window. Upon receiving such a command from the user, the present invention will suppress and hide the contents from the second version while maintaining the first version and the third version.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, various embodiments encompass present and future known equivalents to the components referred to herein by way of illustration. Moreover, it shall also be noted that the figures are intended only to facilitate the description of the disclosed embodiments and/or examples but are not representative of an exhaustive treatment of all possible embodiments and/or examples and are not intended to impute any limitations as to the scope of the claims, embodiments, and/or examples. In addition, any figures or their corresponding description need not necessarily portray all aspects or advantages in any particular environment. Any aspect or advantage described in conjunction with a particular embodiment and/or example is not necessarily limited to that embodiment and/or example and can be practiced in any other embodiments and/or examples even if not so illustrated. References throughout this specification to "some embodiments" or "other embodiments" refer to a particular feature, structure, material or characteristic described in connection with the embodiments as being included in at least one embodiment. Thus, the recitation of the phrases "in some embodiments" or "in other embodiments" in various places throughout this specification is not necessarily referring to the same embodiment or embodiments. The disclosed embodiments are not intended to be limiting of the claims.

In addition, unless otherwise explicitly stated, the recitation of the phrases "in some embodiments" or "in other embodiments" in this specification does not necessarily mean any of the features, advantages, aspects, etc. described "in some embodiments" do not or cannot be combined with any of the other features, advantages, aspects, etc. described "in other embodiments". Thus, any features, advantages, aspects, etc. described in this specification can be combined and can function in conjunction with each other, unless otherwise explicitly stated or recited.

FIG. 1 illustrates a high level block diagram of a simplified system for determining layout equivalence between a plurality of versions of a single layout of a multi-fabric electronic design in one or more embodiments. More specifically, a first version multi-fabric layout 112 (hereinafter the "first layout") and a second version multi-fabric layout 114 (hereinafter the "second layout") may be identified from, for example, the memory or one or more storage devices 100. For example, a layout session of an EDA layout tool may open a first IC (integrated circuits) layout 102, a first IC package layout 104, or a first PCB (printed circuit board) layout 106 as the first layout 114. The layout session may further open a second IC (integrated circuits) layout 102, a second IC package layout 104, or a second PCB (printed circuit board) layout 106 as the second layout 114 of a multi-fabric electronic design. The multi-fabric electronic design spans across multiple design hierarchies. For example, a PCB layout includes circuit components in the PCB design fabric, the IC package design fabric, and the IC design fabric. Hierarchically, the PCB design fabric includes the IC package design fabric which, in turn, includes the IC design fabric. For example, a PCB layout may include a plurality of IC packages, and each IC package includes one or more ICs. It shall be noted that these design fabrics are provided herein for the ease of illustration and description, and that other design fabrics are also contemplated.

One or more computing systems (not shown) may invoke and execute a plurality of modules, which are specifically programmed and stored at least partially in memory of and functions in conjunction with at least one microprocessor or processor core of the one or more computing systems, to perform various functions to determine layout equivalence between the first layout and the second layout of the multi-fabric electronic design. For example, the one or more computing systems may execute the one or more collaborative comparators (108) to identify connectivity (e.g., schematic connectivity, layout connectivity, etc.) for first layout the multi-fabric electronic design. The one or more collaborative comparators (108) may further identify a plurality of nets in the first layout with at least the identified connectivity. The one or more collaborative comparators iterate through the plurality of nets in the first layout to determine layout equivalence between the first layout and the second layout.

In some embodiments, the one or more collaborative comparators 108 may automatically invoke and execute a plurality of EDA tools 110 that natively access respective layouts in respective design fabrics. For example, the one or more collaborative comparators 108 may invoke and execute an IC layout editor to natively access an IC layout, an IC package layout editor to natively access an IC package layout, and a PCB layout editor to natively access a PCB layout. Similarly, the one or more collaborative comparators 108 may invoke and execute an IC schematic editor to natively access an IC schematic, an IC package schematic editor to natively access an IC package schematic, and a PCB schematic editor to natively access a PCB schematic. In some other embodiments, the one or more collaborative comparators may utilize a unified, single EDA tool to access the electronic design in multiple design fabrics. For example, the one or more collaborative comparators 108 may utilize a unified, single layout editor to access an IC layout, an IC package layout, and a PCB layout.

A net is then identified from the plurality of nets in the first layout. In addition, one or more circuit components (e.g., instances of cells, macros, and blocks, discrete circuit components, etc.) connected to the net in the first layout are also identified. At this stage, one or more net segments of the net and one or more circuit components connected thereto are identified and are collectively referred to as "circuit components" for simplicity.

For each circuit component, the one or more collaborative comparators 108 determine a boundary area for the circuit component. Furthermore, the corresponding circuit component in the second layout may further be identified with, for example, the connectivity and/or the binding data between various abstractions of the electronic design.

The one or more collaborative comparators 108 may then query the second layout (e.g., query the layout database for the second layout) with the identifier to determine whether the second layout includes the corresponding circuit component. If the query result is null the second layout is determined not to include the corresponding circuit component that corresponds to the identified circuit component in the first layout. Otherwise, the corresponding circuit component in the second layout is identified; and the one or more collaborative comparators 108 may determine whether the boundary area of the circuit component in the first layout matches that of the corresponding circuit component in the second layout. If the boundary areas of these two circuit components match, the one or more collaborative comparators 108 proceed to examine the next circuit component in the first layout. Otherwise, a discrepancy is identified between the first layout and the second layout.

When a discrepancy is identified, the present invention may generate a view of the corresponding circuit component of the second layout and render the view in the first layout so that the discrepancy can be readily identified in the display window of the first layout (116) in the user interface. Similarly, the present invention may also optionally generate a view of the circuit component of the first layout and render the view in the second layout so that the discrepancy can also be readily identified in the display window of the second layout (118) in the user interface. The present invention may then cause the occurrence of manufacturing or fabrication of the underlying electronic circuit 120 at least by forwarding a final version (e.g., a signed-off version) of the electronic design to fabrication equipment (e.g., photomask manufacturing equipment, lithographic equipment, etc.)

These views may be rendered in an emphasized or de-emphasized manner, depending on the custom settings selected by a user (e.g., by clicking on a command in the menu of the user interface). In addition, these views may further be customized by users to display certain discrepancies while suppressing the remaining discrepancies so that a user may customize the granularity of details of the discrepancies and the layout in the user interface to more efficiently and accurately utilize various modules and tools described herein to facilitate the design tasks.

The present invention provides a more efficient and more accurate solution to address at least the shortcomings and problems with conventional approach. Actual benchmarks on real-world electronic designs have shown that the present invention processes tens of millions of shapes in a pair of layouts per second per processor core and is thus provides better efficiencies in turns of processor runtime and memory footprint than conventional approaches. In some embodiments, the present invention determines layout equivalence among a plurality of different versions of the same layout without using conventional techniques such as the exclusive OR (XOR) operations.

Figure 2:
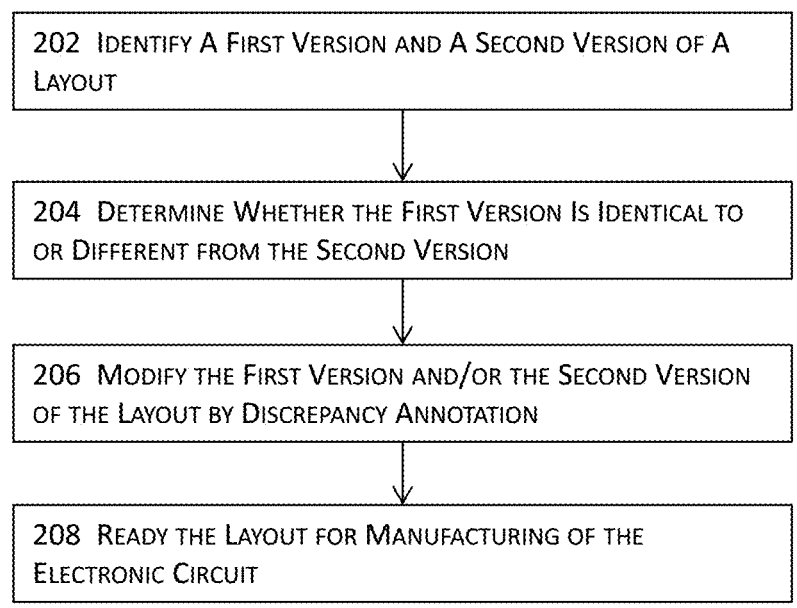
FIG. 2 illustrates a high level block diagram for determining layout equivalence between a plurality of versions of a single layout of a multi-fabric electronic design in one or more embodiments.

FIG. 2 illustrates a high level block diagram for determining layout equivalence between a plurality of versions of a single layout of a multi-fabric electronic design in one or more embodiments. More specifically, a first version and a second version of a layout may be identified at 202. The underlying electronic design of the layout may span across multiple design fabrics, each of which has a respective plurality of layers. For example, the layout may be a PCB layout that includes, for example, a plurality of IC package layouts, each having one or more IC layouts.

With the first and second versions of the layout, the present invention may determine whether the first version is identical to or different from the second version of the layout at 204. In some embodiments, the equivalence or discrepancy between the two versions of the same layout may be determined by one or more computing systems with area query techniques, instead of the conventional techniques with Boolean operations.

With an identified discrepancy, the first version of the layout (or a database view thereof) may be modified at 206 by discrepancy annotation. For example, if a discrepancy is identified at 204 between a circuit component in the first version and a corresponding circuit component in a second version, the first version of the layout may be overlaid with a view of the corresponding circuit component or at least the portion of the corresponding circuit component that causes the discrepancy. Similarly, the second version of the layout may be overlaid with a view of the circuit component or at least the portion of the circuit component in the first version that causes the discrepancy.

Once the layout editing is complete, post-layout optimizations, sign-off, and design closure may be further performed on the latest version of the layout to ready the layout for manufacturing and to cause manufacturing of the underlying electronic design at 208. For example, the PCB layout, the IC package layout(s), the IC layout(s) may be transmitted to and inputted into respective fabrication equipment that respectively manufactures the PCB, the IC package(s), and the photomasks that are in turn used in the manufacturing of the IC(s) in photolithographic equipment.

The present invention thus conserves invaluable computational resources (e.g., processor runtime, processor cycles, network bandwidth, and memory footprint) by determining layout equivalence with the more efficient area probing or area query techniques and at least the pre-filtering technique, without performing the computation intensive Boolean operations. Moreover, the present invention provides a more efficient, more accurate, and more versatile solution to at least the technological problems described in the Background section in that the present invention applies with full and equal effects to flat layouts and hierarchical layouts, without flattening any hierarchies.

In addition, the present invention reports a much wider varieties of discrepancies in a clean and readily discernable manner in the user interface. For example, conventional approaches flatten a hierarchical design by promoting all geometric shapes to the top hierarchy of both versions of layout and performs the Boolean XOR operations between these two flattened versions of a hierarchical layout. Any discrepancies between the two versions are thus reported in the form of a flattened structure that provides marginal, if any, value in informing users what the discrepancies really represent, where the discrepancies are actually located (e.g., which design fabric, which layer, which cell, which circuit component, etc.) The present invention thus improves not only the computational resource utilization in determining equivalence but also user's experience with using computers at least by providing a wider range of discrepancies in a more informative and useful manner in which such discrepancies are presented.

Figure 3A:
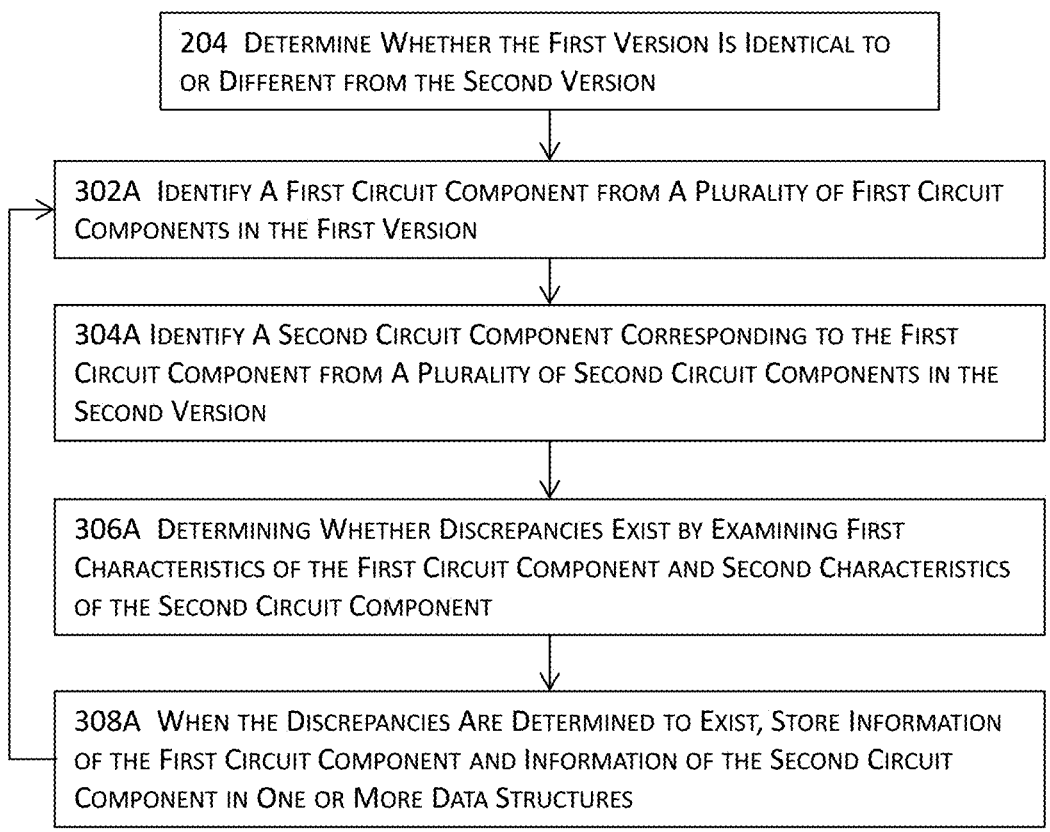
FIGS. 3A-3C illustrate more details about a portion of the high level block diagram illustrated in FIG. 2 in one or more embodiments.
Figure 3B:
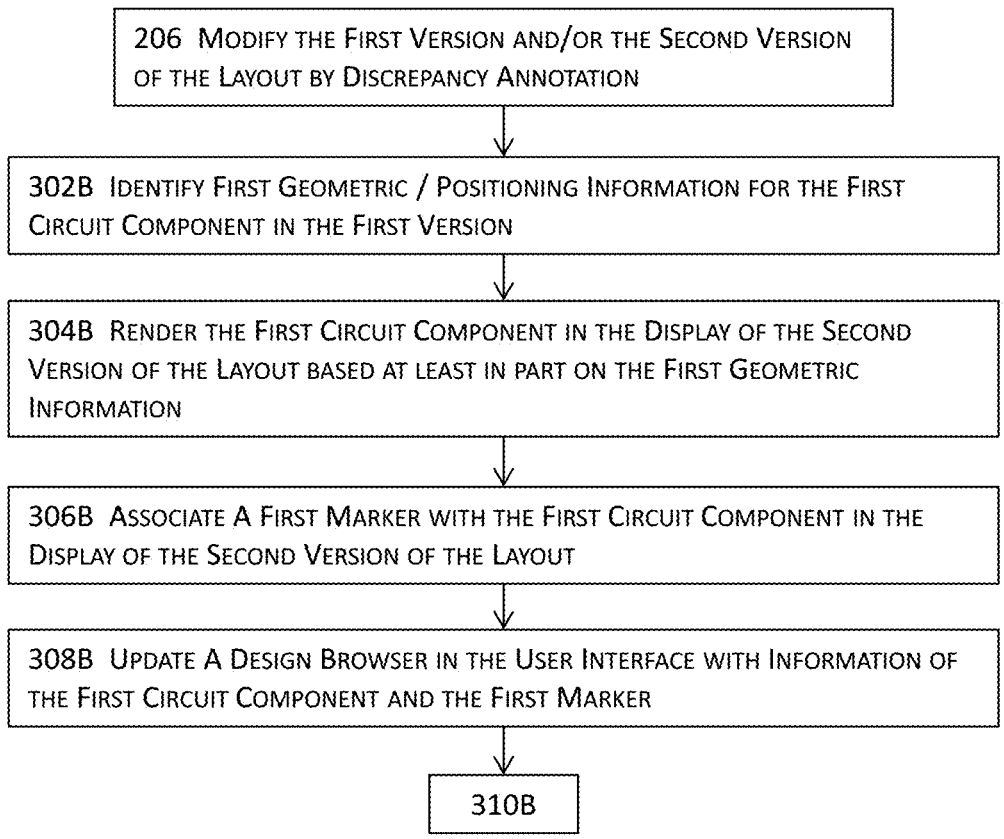
Figure 3C:
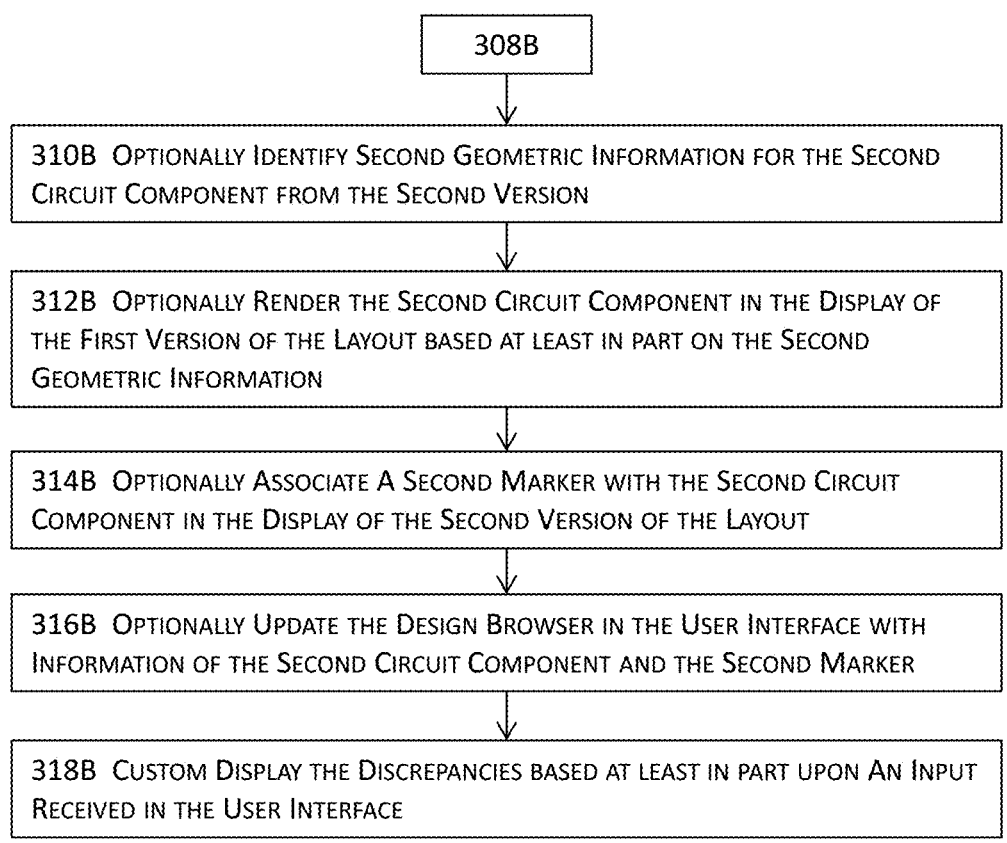

FIGS. 3A-3C illustrate more details about a portion of the high level block diagram illustrated in FIG. 2 in one or more embodiments. More specifically, FIG. 3A illustrates more details about determining whether the first version is identical to or different from the second version of the layout (204) of FIG. 2. In these embodiments, a first circuit component is identified at 302A from a plurality of first circuit components in the first version of the layout that may span across multiple design fabrics. Similarly, a second circuit component corresponding to the first circuit component may also be identified from a plurality of second circuit components in the second version of the layout at 304A.

In some embodiments where the second circuit component cannot be found at 304A for the first circuit component, a discrepancy is identified, and the process returns to 302A to identify the next first circuit component. The identification of or search for the second circuit component may be achieved by using the connectivity and/or binding between various abstractions of the electronic design in multiple design fabrics. For example, some embodiments may identify the identifier of the first circuit component, the identifier of a port, terminal, or pin of the first circuit component, etc. in the first layout.

These embodiments may then query connectivity or the binding information (e.g., binding information between a layout and a schematic, binding information between two layouts in the same design fabric, binding information between two layouts in two different design fabrics, etc.) to determine whether the identifier or a corresponding identifier can be found in the second version. The identifier of a circuit component usually (but does not necessarily) has the same identifier for different versions of the same layout. Nonetheless, the identifier of a circuit component (e.g., a pin of an IC) does not necessarily have the same identifier in different design fabrics. For example, a pin of an IC may have a first identifier in the IC layout yet may have a different identifier in the corresponding IC package layout. The binding information creates a link between such different identifiers so that these different identifiers may be cross referenced with each other for the same circuit component.

When the second circuit component is identified at 304A, some embodiments may determine whether one or more discrepancies exist between the first circuit component and the second circuit component at 306A. This determination may be made at 306A by, for example, examining one or more first characteristics of the first circuit component and one or more second characteristics of the second circuit component.

In some embodiments where area query techniques are used to determine equivalence or discrepancies, the first and second characteristics comprise geometric information pertaining to the boundary area of the first circuit component and the second circuit component. It shall be noted, however, area query techniques may or may not require the determination of areas. For example, area query techniques may examine areas occupied by the first circuit component and the second circuit component in some embodiments or may simply examine the coordinates of some or all of the vertices of the first and second circuit components without using the areas of these circuit components.

Moreover, in determining equivalence or discrepancies, some embodiments of the present invention may determine, as a pre-filtering process, whether a corresponding circuit component in the second version of the layout can be found to correspond to the circuit component in the first version. If the corresponding circuit component cannot be found in the second version for a circuit component in the first version, a discrepancy is found, and the present invention proceeds to the next circuit component in the first version.

On the other hand, if the corresponding circuit component is found in the second version, the present invention may further determine the boundary area of a circuit component (e.g., one or more net segments, a cell, a block, a macro, etc.) in the first version. The present invention further determines whether the corresponding boundary area of the corresponding circuit component matches (e.g., coincides with) the boundary area of the circuit component in the first version. If the two boundary areas do not match a discrepancy is also identified between the two versions.

When discrepancies are determined to exist between the first circuit component and the second circuit component, some embodiments may store information pertaining to the first circuit component, the second circuit component, and the discrepancies in one or more data structures at 308A.

These one or more data structures may be pre-existing (e.g., layout database) or may be generated anew. For example, a separate data structure may be generated to store the discrepancies while providing links (e.g., pointers, symbolic links, etc.) between the discrepancies and the first circuit component in the layout database for the first version of the layout as well as between the discrepancies and the second circuit component in the layout database for the second version of the layout.

The process may then return to 302A to identify the next first circuit component from the plurality of first circuit components and repeat the process described above until all the circuit components in the first version are processed. In the event that there are still one or more second circuit components in the second version after all the circuit components in the first version have been processed, discrepancies are also identified for each of the remaining one or more circuit components in the second version.

FIGS. 3B-3C jointly illustrate more details about modifying the first version and/or the second version (206) of FIG. 2. Some embodiments identify one or more first characteristics for the first circuit component in the first version of the layout at 302B. The one or more first characteristics may include geometric or positioning characteristics that determine the location and/or orientation of the first circuit component in the first version of the layout. These embodiments may then render a representation of the first circuit component or a view thereof in the display of the second version of the layout at 304B. The representation may be overlaid and aligned in the second version to show the exact differences between the two versions with respect to these two circuit components.

The area of discrepancy including the discrepancy or the first circuit component causing the discrepancy may be graphically and/or textually (e.g., by using expandable and collapsible balloons) emphasized or de-emphasized. In this manner, a user can easily comprehend the difference between the two corresponding circuit components in these two versions.

The first circuit component displayed in the second version of the layout may be associated with a first marker at 306B. A marker may include a graphical symbol that is attached to or is within close proximity of the first circuit component to facilitate the identification of the discrepancy and/or access to more detailed information about the discrepancy in some embodiments. In addition or in the alternative, marker may include a graphical and/or textual emphasis associated with or attached to the first circuit component in the second version of the layout.

In some embodiments where the user interface includes a design browser comprising the hierarchical or tree structure of the electronic design and respective circuit components, this design browser may also be graphically and/or textually emphasized at 308B to provide notice and/or information about the discrepancy and circuit components involved in causing the discrepancy.

Some embodiments may further optionally identify one or more second characteristics for the second circuit component in the second version of the layout at 310B. The one or more second characteristics may include, for example, geometric or positioning characteristics that determine the location and/or orientation of the second circuit component in the second version of the layout. These embodiments may then render a representation of the second circuit component or a view thereof in the display of the first version of the layout at 312B. Similar to displaying the representation of the first circuit component in the second version of the layout, the representation may be overlaid and aligned in the first version to show the exact differences between the two versions with respect to these two circuit components.

The area of discrepancy including the discrepancy or the second circuit component causing the discrepancy may also be graphically and/or textually (e.g., by using expandable and collapsible balloons) emphasized or de-emphasized to facilitate easy and efficient comprehension of the difference between the two corresponding circuit components in these two versions. The second circuit component displayed in the first version of the layout may be associated with a second marker at 314B in an identical or similar manner as that descried with reference to 306B.

In some embodiments where the user interface includes a design browser comprising the hierarchical or tree structure of the electronic design and respective circuit components, this design browser may also be graphically and/or textually emphasized at 316B to provide notice and/or information about the discrepancy and circuit components involved in causing the discrepancy.

Users may customize the display of discrepancies at 318B based at least in part upon an input received in the user interface. For example, a user may select the granularity of details for displaying discrepancies by clicking on one or more icons or menu commands in the user interface. As another example, a user may select one or more design fabrics, one or more layers, one or more cells, blocks, macros, or circuit components to display or not to display in the user interface. For example, a user may configure a layout editor to display only the discrepancies on a particular layer of a specific instance of a cell in a chosen design fabric by clicking on the commands to select the layer and the specific instance, while suppressing the display of the remaining circuit components, layers, and design fabrics.

In some embodiments, a user may use discrepancy to construct a filter to limit the amount of information displayed in the user information. For example, a user may display only the discrepancies in the user interface, while suppressing the remaining content of the layout; a user may further define a region (e.g., by pointing and dragging a pointer of a pointing device) in a layout to show only discrepancies within the region; a user may also select specific types of circuit components in one or more hierarchies (e.g., interface circuit components between two design fabrics) that give rise to discrepancies and display only such discrepancies; a user may select a specific time period during which discrepancies occurred; etc.

In some embodiments where other information (e.g., analysis results) are also generated, the present invention also associates such other information with the layout and specifically with the discrepancies. For example, in a first version of a layout also showing a circuit component of a second version of the layout, some embodiments may augment the display of the layout with the respective analysis results (e.g., nodal voltage values, timing delays, susceptibility to electromagnetic interferences, electromigration effects, etc.), and associate the respective analysis results with the pertinent circuit components of different versions. These embodiments thus provide an interactive, highly customizable solution for determining layout equivalence or discrepancies to enhance the user's experience with using the computing system in facilitating the design, implementation, optimization, and manufacturing of the underlying electronic design.

Figure 4A:
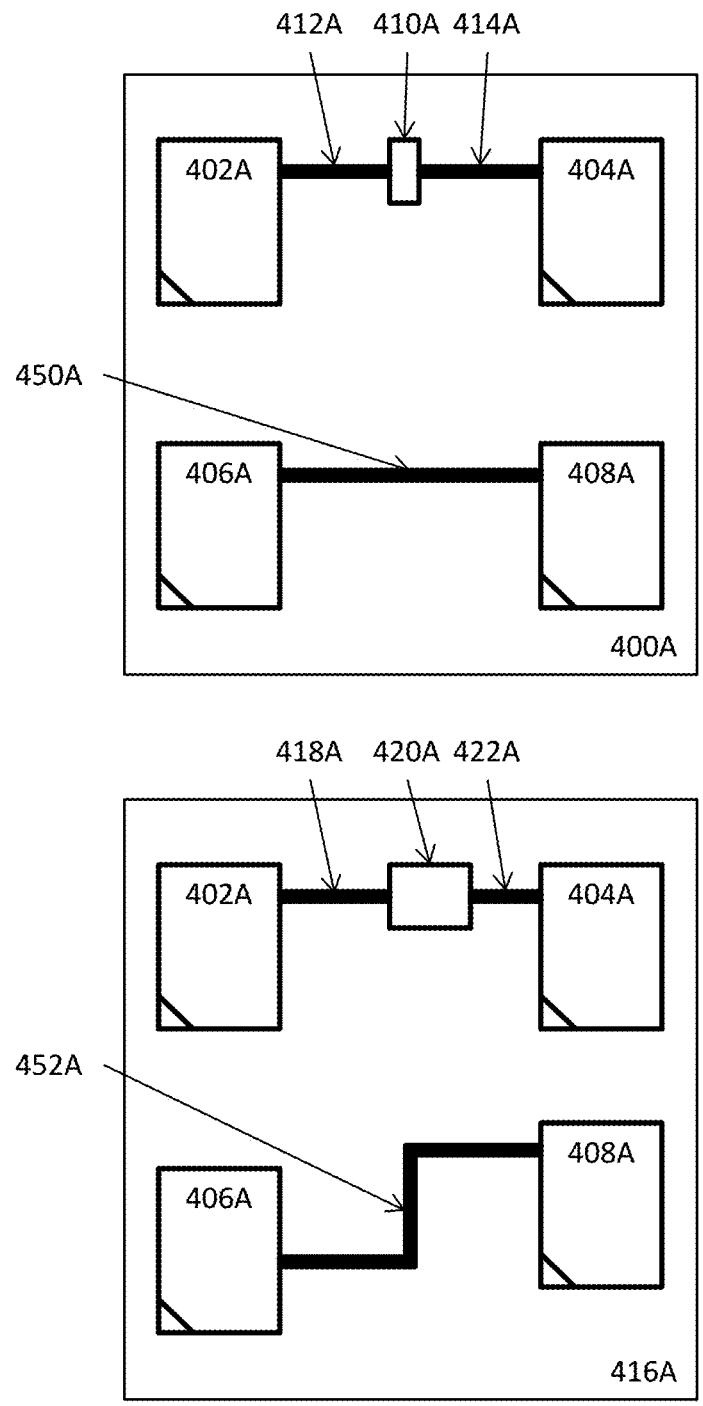
FIGS. 4A-4D illustrate some working examples of the techniques described herein in one or more embodiments.

FIGS. 4A-4D illustrate some working examples of the techniques described herein in one or more embodiments. More specifically, FIG. 4A illustrates a first version 400A of a layout and a second version 416A of the same layout. The first version 400A of the layout includes four cell instances (402A, 404A, 406A, 408A) and a discrete circuit component 410A together with an interconnect 412A connecting the cell instance 402A and the discrete circuit component 410A and another interconnect 414A connecting the discrete circuit component 410A and the cell instance 404A. Cell instance 406A and 408A are also electrically connected with interconnect 450A.

The second version 402A of the layout also includes the same four cell instances (402A, 404A, 406A, 408A) and a different discrete circuit component 420A together with an interconnect 418A connecting the cell instance 402A and the discrete circuit component 420A and another interconnect 422A connecting the discrete circuit component 420A and the cell instance 404A. Cell instance 406A and 408A are also electrically connected with interconnect 452A.

Figure 4B:
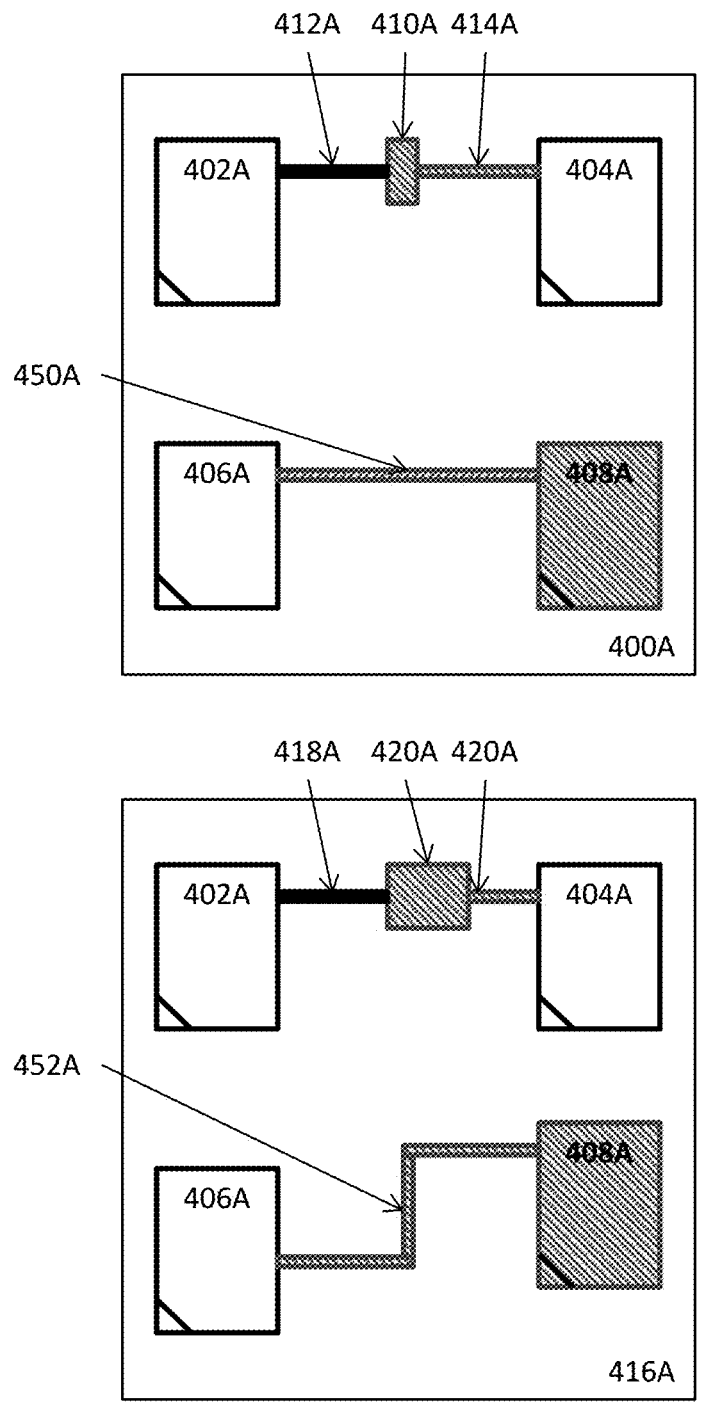

FIG. 4B illustrates the determination results of layout equivalence between the first version and the second version of the layout illustrated in FIG. 4A. More specifically, FIG. 4B illustrates graphically emphasizing the display of the circuit components that cause the discrepancies. For example, a collaborative comparator may identify the discrete component 410A in the first version and queries the second version layout (e.g., the layout database of the second version) with a predicate having the first circuit component identifier as a part of the predicate. The query returns null because the discrete circuit component 410A is replaced with the discrete circuit component 420A in the second version. As a result of the null result set, a first discrepancy is identified. The circuit component 410A may thus be highlighted in the first version due to the contribution of the circuit component 410A to the first discrepancy. Similarly, circuit component 420A may also be highlighted in the second version of the layout for its contribution to the discrepancy. In some embodiments, no area query needs to be performed because looking up a component identifier is more efficient than performing an area query, although area queries may nevertheless be performed to identify the first discrepancy in some other embodiments.

The collaborative comparator may identify interconnect 414A in the first version and its corresponding interconnect 414A (e.g., by using the output port identifier of the discrete circuit component 410A that may be mapped to or bound with the discrete circuit component 414A or the input port identifier of instance 404A in the connectivity). The collaborative comparator may then perform an area query by first determining the first boundary area of interconnect 414A and the second boundary area of interconnect 420A and determining whether these two boundary areas occupy the same space.

More specifically, the collaborative comparator may establish the first boundary area by using the end point coordinates of interconnect 414A and the width value either from the first version or from the techfile of the layout in some embodiments. In these embodiments, the collaborative comparator simply needs to compare the corresponding pairs of end points as well as the width values of interconnects 414A and 420A to determine whether the two boundary areas match. In some other embodiments, the collaborative comparator may extract the four vertices of interconnect 414A and the corresponding four vertices of interconnect 420A in the determination of the two boundary areas. It shall be noted that the aforementioned methodology appears to utilize only the planar coordinates of vertices because the thickness of an interconnect is commonly specified in a techfile for the layout. Regardless of the techniques used in determining the boundary areas, the collaborative comparator can quickly determine that these two boundary areas do not occupy the same space and then identify the second discrepancy. The interconnect 414A may be highlighted in the first version; and the interconnect 420A may also be highlighted in the second version.

The collaborative comparator may similarly process the remaining circuit components and identify another discrepancy between instance 408A in the first version and instance 408A in the second version that occupies a different location despite having the same physical size. The other discrepancy between the first version and the second version exists between interconnect 450A and interconnect 452A, both of which may then be highlighted in their respective versions.

Figure 4C:
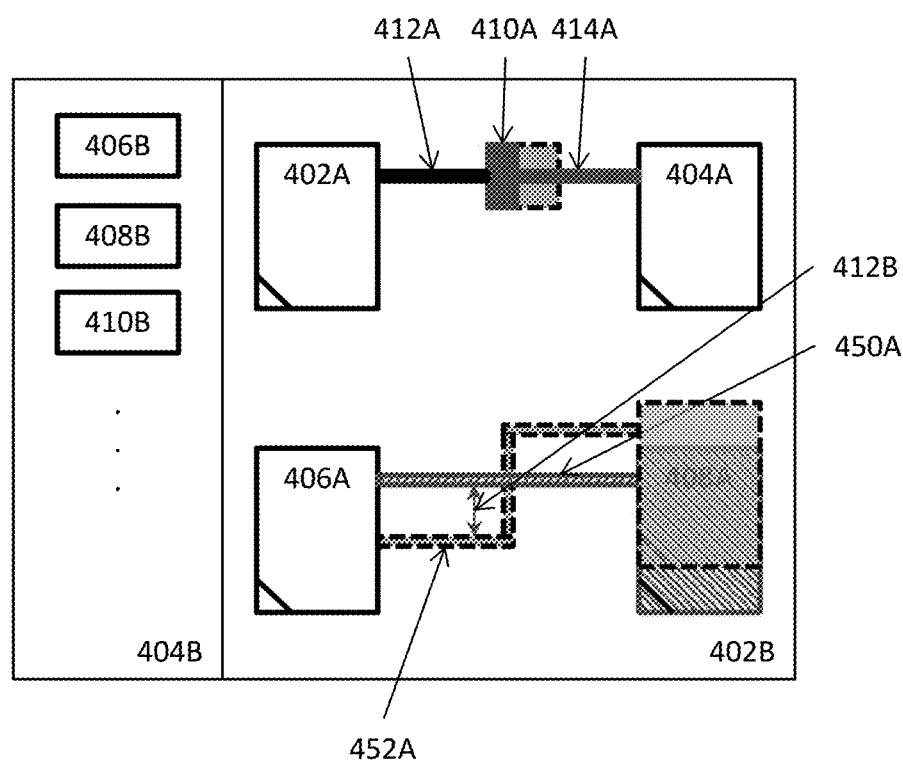

FIG. 4C illustrates an example display window of the first version of the layout 402B after the layout equivalence determination. In this example, the circuit components (e.g., 410A, 414A, and 450A) causing discrepancies are highlighted. In addition, a representation of the circuit components that also contribute to discrepancies in the second version of the layout is also overlaid in the first version of the layout as illustrated in FIG. 4C. for example, a representation including interconnect 452A and instance 408A at a different location) is overlaid in the display. The overlaid representation may be rendered in an emphasized or de-emphasized manner in a user-configurable manner.

FIG. 4C further illustrates rendering a marker or link 412B between each pair of circuit components in which discrepancies are identified. In addition, the example user interface illustrated in FIG. 4C further includes a design browser 404B that may show information such as a collapsible design hierarchical structure 406B, respective circuit components 408B, information pertaining to discrepancies 410B, etc.

Figure 4D:
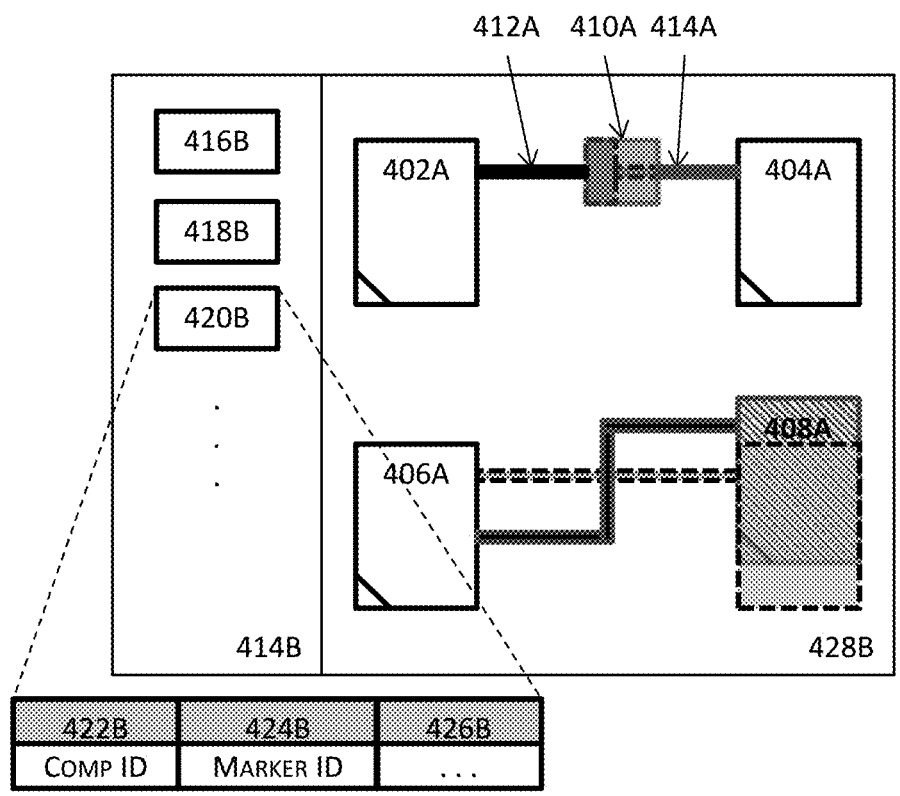

FIG. 4D illustrates overlaying a representation of the circuit components causing discrepancies in the first version in the second version 428B of the layout. This representation of the first version circuit components may also be displayed in an emphasized or de-emphasized manner. In addition, the user interface illustrated in FIG. 4D also includes a design browser 414B that displays information such as a collapsible design hierarchical structure 416B, respective circuit components 418B, information pertaining to discrepancies 420B, etc. Moreover, the information pertaining to discrepancies 420B may further include and display a tabulated structure comprising information such as the circuit component identifier 422B, the corresponding marker identifier 422B that corresponds to a particular discrepancy (hence a circuit component may correspond to multiple markers and thus multiple marker identifiers), identifiers of markers 424B, any other suitable information 426B.

The design hierarchical structure 416B in the design browser 414B may be expanded to show circuit components at each hierarchical level (e.g., hierarchical levels such as PCB-IC Package 1-IC 1-Metal 5-Cell 9 . . . .) Moreover the design browser 414B may be linked to the display area so that when a user clicks on a circuit component (or a marker identifier, a circuit component identifier, etc.) in the design browser, the corresponding circuit component will be displayed in an emphasized manner to indicate the user's action, and vice versa.

Figure 5:
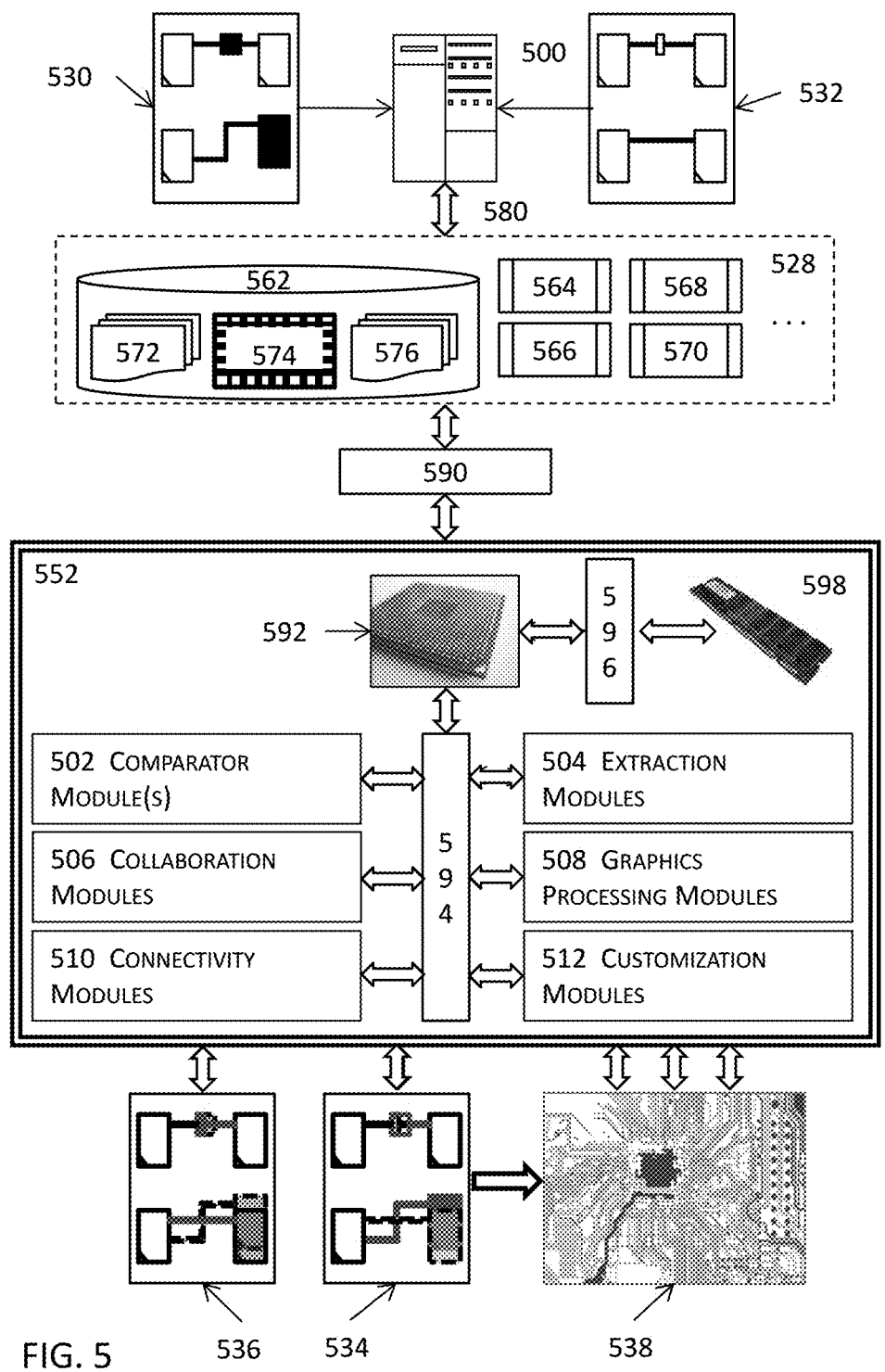
FIG. 5 illustrates an example computing system for determining layout equivalence between a plurality of versions of a single layout of a multi-fabric electronic design in one or more embodiments.

FIG. 5 illustrates an example computing system that performs various determining layout equivalence between a plurality of versions of a single layout of a multi-fabric electronic design in one or more embodiments. More specifically, the computing system 500 in FIG. 5 may comprise one or more computing systems 500, such as a general purpose computer described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In this illustrated system in FIG. 5, one or more computing systems 500 may invoke and execute various modules to identify a multi-fabric electronic design 530 (e.g., a layout spanning across the PCB design fabric, the IC package design fabric, the IC design fabric, etc.). These one or more computing systems may further optionally identify, for example, a corresponding schematic design for each design fabric (not shown), a corresponding layout (not shown) for each design fabric, etc. and bind these electronic designs at different abstraction levels (e.g., schematic level, layout level, etc.) in different design fabrics together so that these electronic designs may be cross-referenced with each other. For example, a component in a particular electronic design (e.g., an IC schematic design) can be readily and efficiently identified in the other electronic designs (e.g., the PCB layout, the IC package layout, etc.) with the cross-reference.

The one or more computing systems 500 may invoke and execute a plurality of modules, which are specifically programmed and stored at least partially in memory of and functions in conjunction with at least one microprocessor (e.g., 592) or processor core of the one or more computing system s 500, to perform various functions described herein on the first version of a layout 530 and the second version 532 of the same layout. For example, the one or more computing systems may identify connectivity of the multi-fabric electronic design and execute one or more comparator modules (502) and optionally one or more collaboration modules (506) to determine layout equivalence between the first version (530) and the second version (532) of the layout. A collaboration module (506) enables multiple users to edit the same layout simultaneously or in a sequential manner.

The determination of layout equivalence may further invoke the execution of one or more connectivity modules (510). For example, when a first circuit component in the first version (530) is being processed for layout equivalence, a connectivity module may be executed to identify a second circuit component in the second version (532) that corresponds to the first circuit component. In addition, the performance of area queries may automatically invoke and execute one or more extraction modules (504) that obtains various geometric and/or positioning characteristics (e.g., coordinates, lengths, widths, orientations, etc.) of circuit components; and these geometric and/or positioning characteristics may be further used in determining the boundary areas of circuit components.

Once a discrepancy is identified, one or more graphics processing modules 508 may be executed to render various representations, graphic highlights, etc. in the first version and the second version of the layout as described above. An example of the processing results of these one or more graphics processing modules 512 includes the annotated or rendered first version (534) that include a representation of circuit components in the second version. Another example of the processing results of these one or more graphics processing modules 512 includes the annotated or rendered second version (536) that includes a representation of circuit components in the first version. The present invention may then cause the occurrence of manufacturing or fabrication of the underlying electronic circuit 538 at least by forwarding a final version (e.g., a signed-off version) of the electronic design to fabrication equipment (e.g., photomask manufacturing equipment, lithographic equipment, etc.) One or more customization modules 512 provide users with the functions, menus, and commands, etc. to customize what is to be displayed in the user interface as described above.

In some embodiments, the one or more computing systems 500 may invoke various system resources such as the processor(s) or processor core(s), memory, disks, etc. The one or more computing systems 500 may also initiate or interact with other computing systems to access, via a computer bus architecture (e.g., a system bus, a control bus, a data bus, or any combinations thereof), various resources 528 that may comprise a floorplanner, a global routing engine, and/or a detail routing engine 564, a layout editor 566, a design rule checker 568, a verification engine 570, etc. In some embodiments, each design fabric may have its own dedicated, native engines, editors, checkers, etc. mentioned above. In some other embodiments, multiple design fabrics (e.g., an IC package design fabric and an IC design fabric) may use a single unified tool (e.g., a single, unified layout editor) that performs its functions to fulfill the respective needs in these multiple design fabrics.

These various resources 528 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 530 with reduced interferences and disturbances) is finalized for tapeout; and the electronic design is transmitted to mask fabrication equipment for mask preparation and mask writing to produce photomasks that are then used in the actual manufacturing of the electronic circuits represented by the electronic design.

The one or more computing systems 500 may further write to and read from a local or remote (e.g., networked storage device(s)) non-transitory computer accessible storage 562 that stores thereupon data or information such as, but not limited to, one or more databases (574) such as schematic design database(s) or physical design database(s), electronic circuit design specification database(s), techfiles for multiple design fabrics, various statistics, various data, rule decks, various design rules, constraints, etc. (572), or other information or data (576) that may be used to facilitate the performance of various functions to achieve the intended purposes. The one or more databases may also include, for example, one or more data structures for facilitating determination of layout equivalence in multi-fabric electronic designs.

In some embodiments, the computing system 500 may include the various resources 528 such that these various resources may be invoked from within the computing system via a network or a computer bus 580 (e.g., an internet session, an intranet session, a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in conjunction with a microprocessor 592 via a computer bus 594 to access or invoke various modules in 552 (e.g., 502-512 described above) in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The set of modules 552 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., FastSPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The one or more computing systems 500 may invoke and execute one or more modules in 528 and/or 552 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 500 for execution.

SYSTEM ARCHITECTURE OVERVIEW

Figure 6:
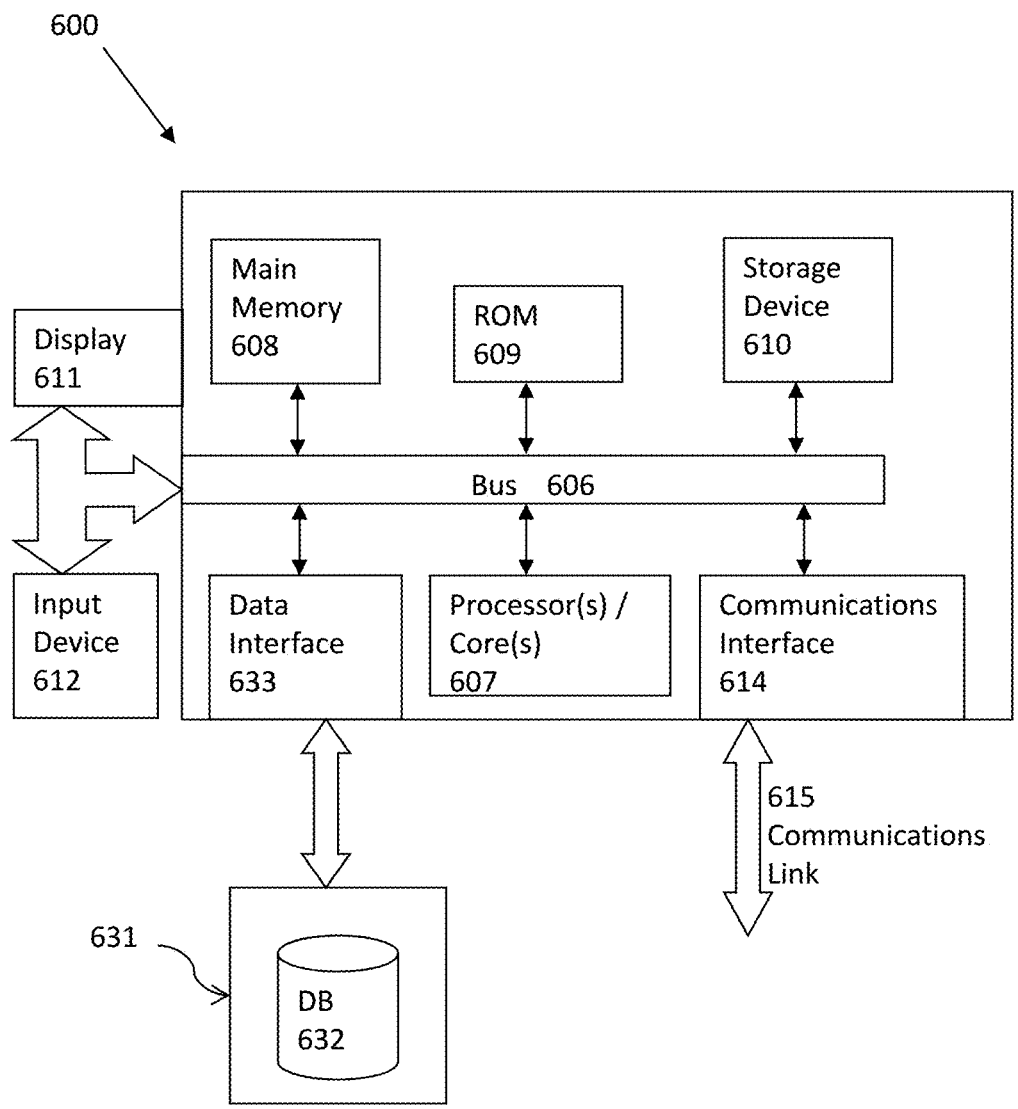
FIG. 6 illustrates a computerized system on which a method for determining layout equivalence between a plurality of versions of a single layout of a multi-fabric electronic design may be implemented.

FIG. 6 illustrates a computerized system on which a method for determining layout equivalence between a plurality of versions of a single layout of a multi-fabric electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for determining layout equivalence between a plurality of versions of a single layout of a multi-fabric electronic design, comprising:
   identifying a first version and a second version of a layout of an electronic design that spans across multiple design fabrics;
   determining, by one or more collaborative comparator modules stored at least partially in memory of and functioning in conjunction with at least one microprocessor of a computing system, an equivalence or discrepancy between the first version and the second version of the layout, wherein determining the equivalence or the discrepancy between the first version and the second version comprises:
      executing at least a first query on the first and the second versions of the layout or on respective connectivity of the first and the second versions, and
      executing an area query on the first and the second versions of the layout; and
   modifying the first version or the second version of the layout by discrepancy annotation.

2. The computer implemented method of claim 1, wherein determining the equivalence of the discrepancy between the first version and the second version
   identifying a first circuit component from a plurality of first circuit components in the first version of the layout; and
   identifying a second circuit component from a plurality of second circuit components in the second version of the layout, wherein the second circuit component in the second version corresponds to the first circuit component in the first version, wherein the equivalence or the discrepancy is determined by executing at least the area query, rather than performing a Boolean operation over the first version and the second version of the layout.

3. The computer implemented method of claim 2, wherein determining the equivalence of the discrepancy between the first version and the second version
   determining whether one or more discrepancies exist between the first circuit component and the second circuit component at least by examining one or more first characteristics of the first circuit component and one or more second characteristics of the second circuit component.

4. The computer implemented method of claim 3, wherein determining the equivalence of the discrepancy between the first version and the second version comprises:
   upon a determination of the one or more discrepancies, storing information pertaining to the first circuit component, the second circuit component, and the one or more discrepancies in one or more data structures.

5. The computer implemented method of claim 1, wherein modifying the first version or the second version of the layout comprises:
   identifying a first set of characteristics for the first circuit component in the first version; and
   rendering a first representation of the first circuit component in a display of the second version of the layout based at least in part upon the first set of characteristics.

6. The computer implemented method of claim 5, wherein modifying the first version or the second version of the layout comprises:
   associating a first marker with the first representation of the first circuit component in the display of the second version of the layout, wherein the first marker is associated with or includes one or more commands which, when executed by the at least one microprocessor, cause the at least one microprocessor to execute further instructions that repair one or more errors associated with the marker in the electronic design; and
   rendering a link between the first representation of the first circuit component and the second circuit component in the display of the second version of the layout.

7. The computer implemented method of claim 6, wherein modifying the first version or the second version of the layout comprises:
   updating a design browser in a user interface with at least information of the first circuit component and the first marker, the user interface comprising the display of the second version of the layout.

8. The computer implemented method of claim 7, wherein modifying the first version or the second version of the layout comprises:
   identifying a second set of characteristics for the second circuit component in the second version; and
   rendering a second representation of the second circuit component in the display of the first version of the layout based at least in part upon the second set of characteristics.

9. The computer implemented method of claim 8, wherein modifying the first version or the second version of the layout comprises:
   associating a second marker with the second representation of the second circuit component in the display of the first version of the layout;
   rendering a second link between the second representation of the second circuit component and the first circuit component in the display of the first version of the layout; and
   updating the design browser in the user interface with at least second information of the second circuit component and the second marker.

10. The computer implemented method of claim 9, wherein modifying the first version or the second version of the layout comprises:
    custom displaying one or more discrepancies between the first version and the second version based at least in part upon an input received via an input device at the user interface.

11. A system for determining layout equivalence between a plurality of versions of a single layout of a multi-fabric electronic design, comprising:
   non-transitory computer accessible storage medium storing thereupon program code; and
   one or more one or more collaborative comparator modules stored at least partially in memory of and functioning in conjunction with at least one microprocessor of one or more computing systems, wherein the at least one microprocessor of the one or more computing systems is configured to execute at least the one or more collaborative comparator modules at least to:
      identify a first version and a second version of a layout of an electronic design that spans across multiple design fabrics;
      determine an equivalence or discrepancy between the first version the second version of the layout, wherein the equivalence or the discrepancy between the first version and the second version is determined at least by:
         executing at least a first query on the first and the second versions of the layout or on respective connectivity of the first and the second versions, and
         executing an area query on the first and the second versions of the layout; and
      modify the first version or the second version of the layout by discrepancy annotation.

12. The system for claim 11, wherein the at least one micro-processor that is configured to execute at least the one or more collaborative comparator modules is further configured to:
   identify a first circuit component from a plurality of first circuit components in the first version of the layout; and
   identify a second circuit component from a plurality of second circuit components in the second version of the layout, wherein the second circuit component in the second version corresponds to the first circuit component in the first version.

13. The system for claim 12, wherein the at least one micro-processor that is configured to execute at least the one or more collaborative comparator modules is further configured to:
   determine whether one or more discrepancies exist between the first circuit component and the second circuit component at least by examining one or more first characteristics of the first circuit component and one or more second characteristics of the second circuit component; and
   upon a determination of the one or more discrepancies, store information pertaining to the first circuit component, the second circuit component, and the one or more discrepancies in one or more data structures.

14. The system for claim 13, wherein the at least one micro-processor that is configured to execute at least the one or more collaborative comparator modules is further configured to:
   identify a first set of characteristics for the first circuit component in the first version;
   render a first representation of the first circuit component in a display of the second version of the layout based at least in part upon the first set of characteristics;
   associate a first marker with the first representation of the first circuit component in the display of the second version of the layout;
   render a link between the first representation of the first circuit component and the second circuit component in the display of the second version of the layout; and
   update a design browser in a user interface with at least information of the first circuit component and the first marker, the user interface comprising the display of the second version of the layout.

15. The system for claim 14, wherein the at least one micro-processor that is configured to execute at least the one or more collaborative comparator modules is further configured to:
   identify a second set of characteristics for the second circuit component in the second version;
   render a second representation of the second circuit component in the display of the first version of the layout based at least in part upon the second set of characteristics;
   associate a second marker with the second representation of the second circuit component in the display of the first version of the layout;
   render a second link between the second representation of the second circuit component and the first circuit component in the display of the first version of the layout;
   update the design browser in the user interface with at least second information of the second circuit component and the second marker; and
   custom display one or more discrepancies between the first version and the second version based at least in part upon an input received via an input device at the user interface.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for determining layout equivalence between a plurality of versions of a single layout of a multi-fabric electronic design, the set of acts comprising:
   identifying a first version and a second version of a layout of an electronic design that spans across multiple design fabrics;
   determining, by one or more collaborative comparator modules stored at least partially in memory of and functioning in conjunction with at least one microprocessor of a computing system, an equivalence or discrepancy between the first version and the second version of the layout, wherein determining the equivalence or the discrepancy between the first version and the second version comprises:
      executing at least a first query on the first and the second versions of the layout or on respective connectivity of the first and the second versions, and
      executing an area query on the first and the second versions of the layout; and
   modifying the first version or the second version of the layout by discrepancy annotation.

17. The article of manufacture of claim 16, the set of acts further comprising:
   identifying a first circuit component from a plurality of first circuit components in the first version of the layout; and
   identifying a second circuit component from a plurality of second circuit components in the second version of the layout, wherein the second circuit component in the second version corresponds to the first circuit component in the first version.

18. The article of manufacture of claim 17, the set of acts further comprising:
- determining whether one or more discrepancies exist between the first circuit component and the second circuit component at least by examining one or more first characteristics of the first circuit component and one or more second characteristics of the second circuit component; and
- upon a determination of the one or more discrepancies, storing information pertaining to the first circuit component, the second circuit component, and the one or more discrepancies in one or more data structures.

19. The article of manufacture of claim 16, the set of acts further comprising:
- identifying a first set of characteristics for the first circuit component in the first version;
- rendering a first representation of the first circuit component in a display of the second version of the layout based at least in part upon the first set of characteristics;
- associating a first marker with the first representation of the first circuit component in the display of the second version of the layout;
- rendering a link between the first representation of the first circuit component and the second circuit component in the display of the second version of the layout; and
- updating a design browser in a user interface with at least information of the first circuit component and the first marker, the user interface comprising the display of the second version of the layout.

20. The article of manufacture of claim 19, the set of acts further comprising:
- identifying a second set of characteristics for the second circuit component in the second version;
- rendering a second representation of the second circuit component in the display of the first version of the layout based at least in part upon the second set of characteristics;
- associating a second marker with the second representation of the second circuit component in the display of the first version of the layout;
- rendering a second link between the second representation of the second circuit component and the first circuit component in the display of the first version of the layout;
- updating the design browser in the user interface with at least second information of the second circuit component and the second marker; and
- custom displaying one or more discrepancies between the first version and the second version based at least in part upon an input received via an input device at the user interface.

* * * * *